Aug. 5, 1969          J. H. FOX          3,458,932
TRANSMISSION FOR ELECTRIC HAIR CLIPPER
Filed Sept. 11, 1967          2 Sheets-Sheet 1
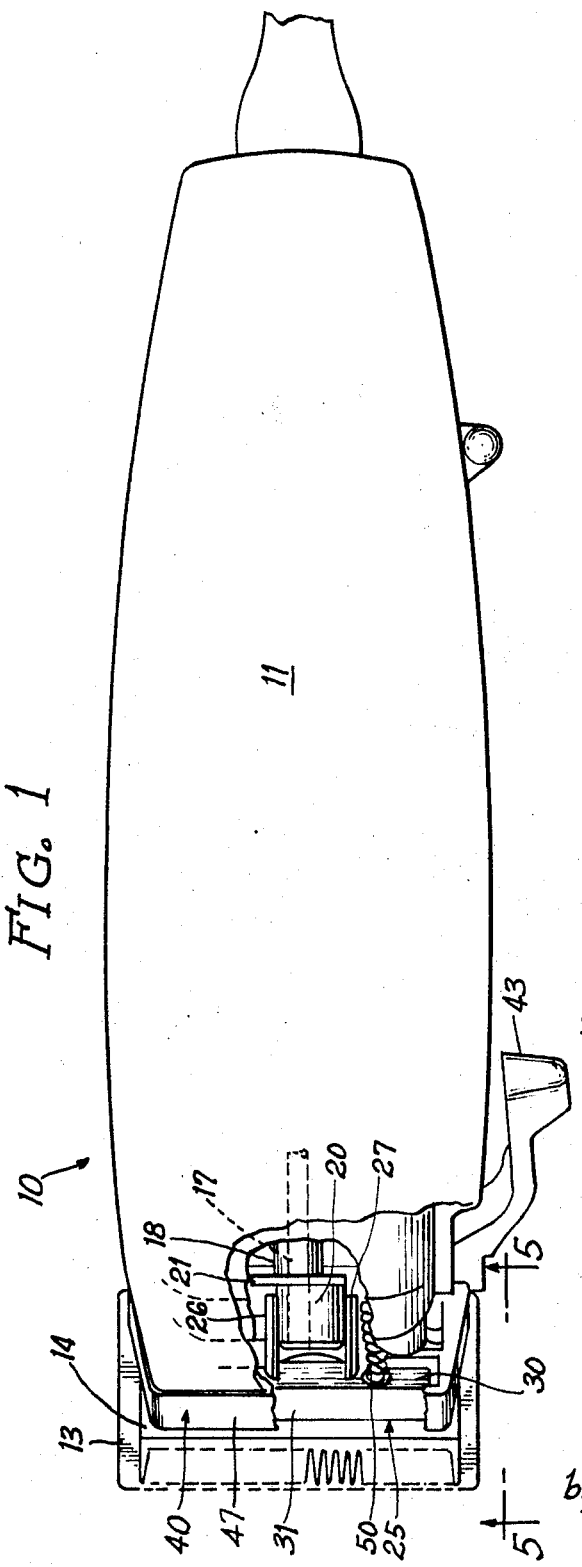
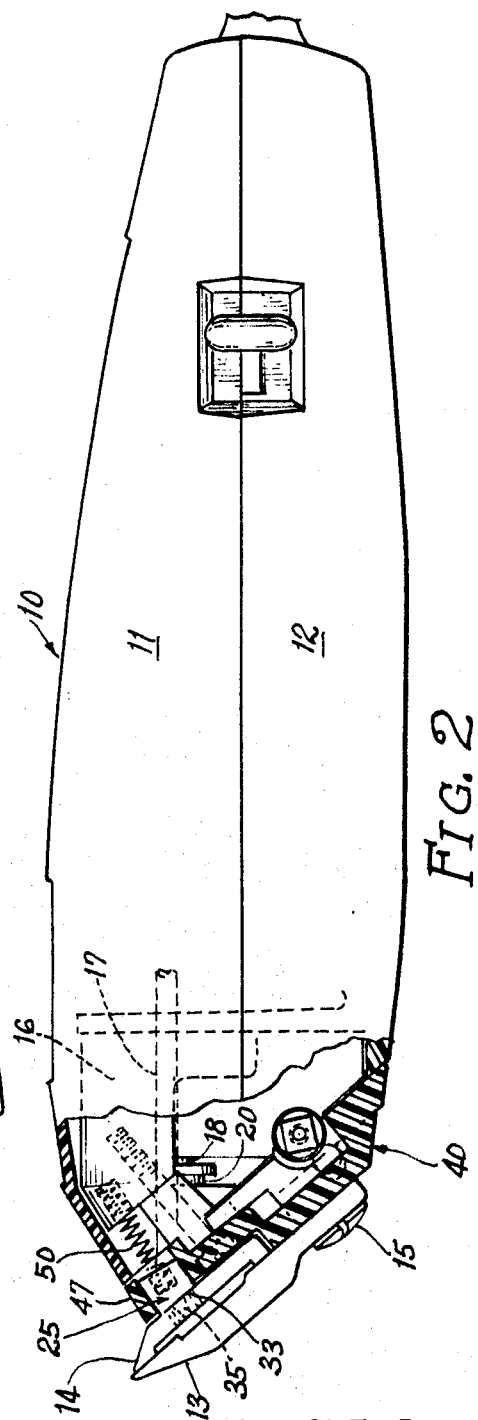
INVENTOR
James H. Fox
by Zabel Baker, York, Jones
and Dithmar  Attorneys Aug. 5, 1969    J. H. FOX    3,458,932
TRANSMISSION FOR ELECTRIC HAIR CLIPPER
Filed Sept. 11, 1967    2 Sheets-Sheet 2

United States Patent Office 3,458,932
Patented Aug. 5, 1969

3,458,932
TRANSMISSION FOR ELECTRIC HAIR CLIPPER
James H. Fox, Torrance, Calif., assignor to Wahl Clipper Corporation, Sterling, Ill., a corporation of Illinois
Filed Sept. 11, 1967, Ser. No. 666,656
Int. Cl. B26b 19/36
U.S. Cl. 30—220                                                    8 Claims

ABSTRACT OF THE DISCLOSURE

An electric hair clipper having a transmission mechanism between a rotary motor shaft and reciprocating cutter blade which converts rotary motion of the motor shaft into reciprocating motion of the cutter blade, the transmission mechanism including a circular cam member on the motor shaft, a cam follower member in operative relation with the cam member, a stationary guide member for the cam follower member, and force-exerting means providing bias via the cam follower member on the cutter blade. In preferred form, the cam member, the cam follower member and the guide member have cooperating portions made of plastic material whereby zero clearance fits with low friction characteristics are provided to insure proper guiding action, an extended life and low noise and heat levels without employing close tolerances in the members.

Background of the invention

Prior clipper transmissions for rotary motor shafts have been noisy in operation, subject to wear which results in increased noise and reduced cutting efficiency, and productive of excessive heat due to friction.

Further, the means used in prior transmissions to provide cutting bias between the two blades usually has involved a spring arrangement whereby pressure has been applied to the reciprocating cutter blade by an element having sliding relation with the blade or some other element in the transmission. The friction inherent in such an arrangement generates excessive heat and involves a loss of effective cutting power.

The present invention, as will be seen, overcomes the shortcomings of prior transmissions, and provides a low cost, low noise and low friction transmission having a long life expectancy.

Summary of the invention

The transmission of the invention includes a circular cam member mounted eccentrically on the rotary motor shaft. A cam follower member is mounted in effective relation with the cam member, and driven thereby in reciprocating manner. The cam follower member has a pair of transversely spaced ears which engage the cam member on opposed sides, and a drive finger which engages a recess in the cutter blade. The finger, of course, imparts reciprocating movement to the cutter blade.

The transmission also includes a fixed guide member which has a pair of spaced guide surfaces that cooperate with a complementary pair of spaced guided faces on the cam follower member. The guide surfaces and guided faces insure that the cam follower member and thus the cutter blade associated therewith will have truly linear reciprocating movement, even when cutting resistance is oncountered. Such linear movement, of course, maximizes the cutting efficiency of the two blades.

The final element of the transmission comprises force-exerting means extending between a stationary part of the clipper and the cam follower member to apply cutting bias between the two blades. In preferred form, this means comprises a pair of spiral compression springs, corresponding ends of the springs respectively seated on the cam follower member and a stationary part of the clipper. The springs have wobble action intermediate their ends during operation, and avoid friction heretofore encountered in applying bias pressure through relatively moving engaging parts. Also, the pressure of the spring is applied forwardly on the cam follower member, and the latter tends to tilt forwardly, thereby applying pressure on the cutter blade in the forward region adjacent the cutting teeth.

In narrower aspect, the elements of the transmission are formed of plastic material which has low friction characteristic and which has the capability of changing dimension in response to stress. Interengaging elements may be designed for interference fits with economical low tolerances. On assembly, the elements will fit relatively tightly together, but dimensional changes will occur which will produce zero clearance fits with relatively little friction between moving parts. This construction involves low cost manufacture and insures quiet operation of the clipper during both early and extended use. Further, the transmission operates with low friction and consequent absence of heat and noise.

Brief description of the drawings

FIG. 1 is a top plan view of an electric hair clipper embodying the invention, the housing partially broken away to show details of the transmission.

FIG. 2 is a side elevational view of the clipper, partially in section, the housing partially broken away.

Description of the preferred embodiment

Figure 3:
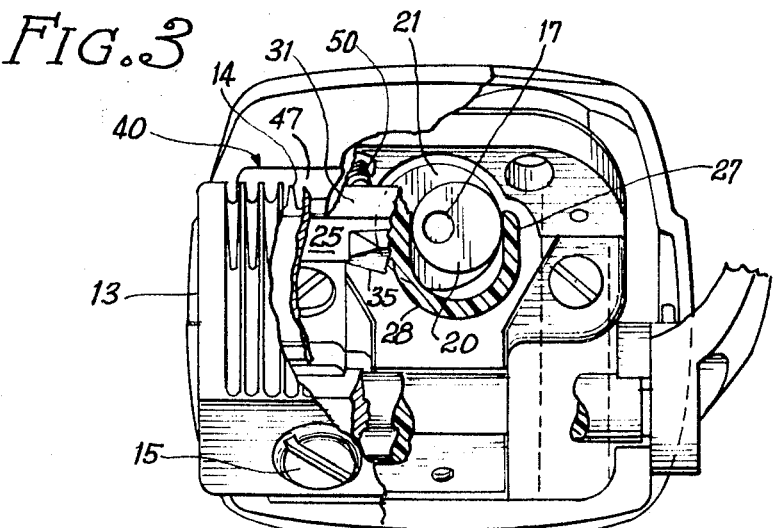
FIG. 3 is a front elevational view of the clipper, partially broken away and partially in section.

Referring to the drawings, the illustrated electric hair clipper includes a housing generally designated 10 having a top housing component 11 and a bottom housing component 12 (FIG. 2) detachably secured together. The front of the clipper is at the left in FIGS. 1 and 2.

The clipper also includes a stationary comb blade 13 having cutting teeth and a reciprocating cutter blade 14 having cutting teeth, as is conventional. Comb blade 13 is secured in place by suitable means such as screws 15 (FIGS. 2 and 3).

Housing 10 encloses a rotary motor (not shown) and a suitable speed reducer 16 (FIG. 2), the details of which are conventional and omitted for clarity.

Figure 5:
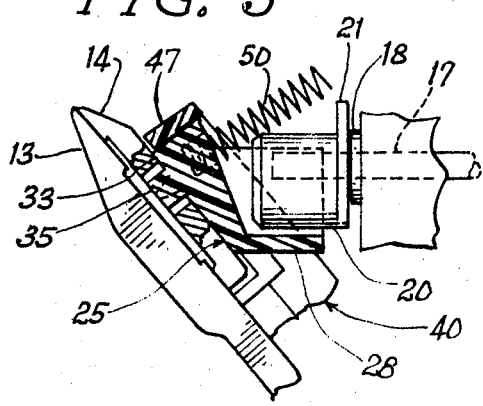
FIG. 5 is a fragmentary side elevational view of the clipper transmission on line 5—5 of FIG. 1, partially in section and with the housing omitted.

A rotary drive shaft 17, shown in broken line in FIGS. 1, 2 and 5 and in end view in FIG. 3, extends through a fixed bearing 18. Shaft 17 is shown extending continuously in FIGS. 1, 2 and 5, but it is to be understood that the shaft is interrupted by suitable gearing in speed reducer 16.

A cam member 20 (FIGS. 1, 2, 3 and 5), circular in cross section, is mounted eccentrically in fixed manner on the forward end of shaft 17. As shown, member 20 has an enlarged circular portion 21 (FIGS. 1, 3 and 5) concentric with shaft 17 which is provided to facilitate tapping the longitudinal opening that receives shaft 17. Cam member 20, of course, is an element in the transmission of the invention.

Figure 4:
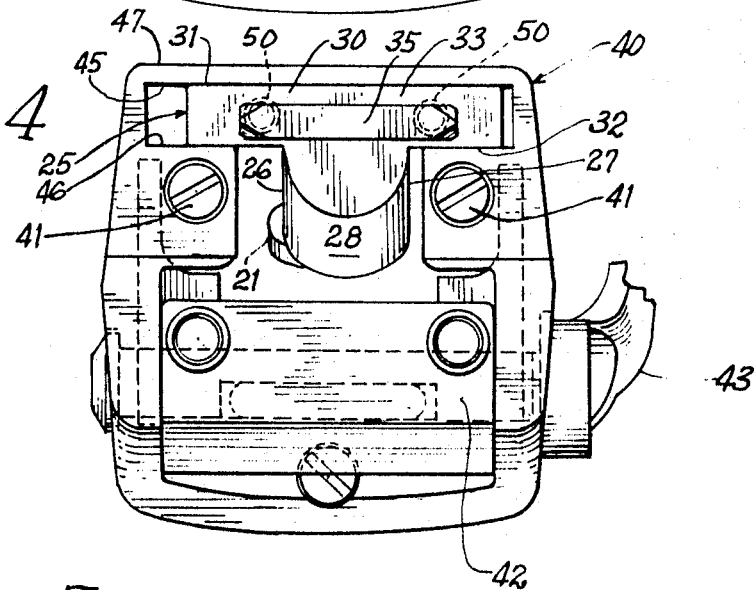
FIG. 4 is a front elevational view of the clipper, the cutter and comb blades and the housing omitted for clarity.

Another element of the transmission is cam follower member 25 (FIGS. 1–5) of irregular shape. Cam follower member 25, as will be seen, constitutes a drive connection between cam member 20 and movable cutter blade 14. As best shown in FIGS. 1 and 4, cam follower member 25 has a pair of transversely spaced ears 26 and 27 which engage opposite sides of cylindrical cam member 20. Thus, cam follower member 25 reciprocates back and forth in response to rotation of eccentric cam member 20. As shown, ears 26 and 27 are interconnected at their lower edges by an integral web 28 (FIGS. 3–5) which may be provided to serve as a reservoir for lubricant.

Cam follower member 25 is generally T-shaped, the stem of the T comprising ears 26, 27 and web 28. This stem portion has an angular relation (FIG. 5) with the remaining body of the cam follower member which constitutes the head of the T and now will be described.

The remaining body of cam follower member 25 includes a transversely extending guided portion 30 (FIGS. 1 and 4) having a forwardly and upwardly facing plane surface 31 (FIGS. 1, 3 and 4). Guided portion 30 also has a rearwardly and downwardly facing plane surface 32, which surface is parallel to plane surface 31 and is interrupted centrally by the presence of ears 26 and 27, as best shown in FIG. 4. Plane surfaces 31 and 32 of cam follower member 25 are hereinafter called guided faces.

Guided portion 30 of cam follower member 25 has a forwardly and downwardly facing plane surface 33, shown in plan view in FIG. 4. This surface has right angular relation with guided faces 31 and 32, and, as will be seen, bears on the upper surface of movable cutter blade 14. This bearing relationship is shown in FIGS. 2 and 5.

A generally rectangular transverse finger 35 (FIGS. 3–5) is formed on surface 33 of guided portion 30. The exposed corners of this finger are cut away to provide beveled surfaces for engagement with a complementary recess in movable cutter blade 14, as generally shown in U.S. Patent No. 2,876,538. The axis of finger 35 is substantially normal to the plane of reciprocation of the blades and parallel to guided faces 31 and 32 of cam follower member 25.

A stationary guide member 40, best shown in FIG. 4, but also shown to some extent in the other figures, is secured to housing 10 by suitable means such as screws 41. Guide member 40 performs two guiding functions in the illustrated clipper, but only one of them is of interest in the present invention. The guide function not of interest in the invention is the guidance of plate 42 (FIG. 4) to which stationary comb blade 13 is mounted by aforesaid screw means 15. Plate 42 and associated comb blade 13 are adapted to be adjusted to vary the length of cut in response to actuation of lever 43.

The function of guide member 40 of interest in the present invention involves the guidance of guided portion 30 of cam follower member 25. It will be recalled that portion 30 has parallel guided faces 31 and 32. Guide member 40, as best shown in FIG. 4, has cooperating guide surfaces 45 and 46 which are plane and parallel to each other. These guide surfaces are engaged by guided faces 31 and 32, respectively, of guided portion 30 of cam follower member 25. They confine the cam follower member and insure that it reciprocates with straight line movement, thereby insuring proper relationship between the teeth of the cutter and comb blades for effective and efficient cutting action.

Guide surface 45, as shown, is a surface of wall 47 forming part of guide member 40. Wall 47 is comparatively thin, and possesses inherent flexibility.

The final element of the present transmission mechanism is the means for exerting pressure on movable cutter blade 14 to establish proper cutting bias between the cutter and comb blades. In preferred form, this pressure-exerting means includes a pair of transversely spaced spiral compression springs 50. Corresponding ends of the two springs 50 are seated respectively on a fixed part of housing 10 and guided portion 30 of cam follower member 25. As shown, the spring ends are seated in recesses in the housing and cam follower member, although other seating arrangements may be used.

During clipper operation, springs 50 have wobble action intermediate the spring ends, applying a force to cam follower member 25 and thence to movable cutter blade 14 without having an objectionable frictional relationship between the springs and a moving part. Springs 50 preferably engage guided portion 30 of cam follower member 25 forwardly of finger 35 which is received within the recess in cutter blade 14. Thus, the force applied by the springs tends to tilt cam follower member 25 forwardly, thereby applying the bias pressure on the forward end of cutter blade 14, that is, the end having the cutting teeth. Accordingly, the bias pressure is applied in optimum position relative to the teeth.

As best shown in FIGS. 2 and 5, the axes of springs 50 preferably incline slightly rearwardly of a plane normal to the engaging surfaces of the comb and cutter blades. This angulation somewhat enhances the concentration of bias pressure on the cutter blade in the region adjacent the teeth. The angulation also provides compensation for wear of guided face 31 and guide surface 45, as will be seen.

The bearing or engaging surfaces of the several elements of the transmission preferably are made of plastic material which has a low friction characteristic and the ability to change shape slightly in response to stress. It has been found that particularly desirable results are achieved by using different plastic materials of the same general type for the several cooperating elements of the transmission.

Thus, for example, cam member 20 desirably is made of molded nylon material (a long-chain poyamide that is thermoplastic). Cam follower member 25 desirably is formed of a material sold by E.I. du Pont de Nemours & Co. under the trademark Delrin (an acetyl resin derived by polymerization of formaldehyde). Guide member 40 desirably is made of molded nylon material or Cycolac A.B.S. material sold by Borg Warner Corporation.

The aforesaid plastic materials all have low friction characteristics, and the ability to change shape or dimension slightly under stress. The transmission elements using these plastic materials can be made with comparatively low tolerances at great savings, and with no impairment of functional capability. The elements can be designed to have interference fits with each other, and the stresses occurring in assembly will cause dimensional changes which provide zero clearance between engaging parts with minimum friction between such parts during relative movement. Ears 26 and 27 also will have an inherent flexibility which will avoid high friction with cam member 20 during the period the dimensional change is taking place.

Cam follower member 25, as intimated above, initially will have a snug or interference fit with guide member 40. Binding or excessive friction during reciprocation of the cam follower member initially is avoided due to the inherent flexibility of forward wall 47 which contains forward guide surface 45. In time, dimensional changes occur to minimize the friction and provide a zero clearance fit with negligible friction. As previously mentioned, any wear between guided face 31 and guide surface 45 resulting from prolonged use is compensated for by springs 50 which tend to urge guided face 31 into bearing engagement with guide surface 45, thereby avoiding a noise condition such as would occur in the presence of clearance between the guided and guide members.

From the above description it is thought that the construction and other advantages of this invention will be readily apparent to those skilled in the art. Various changes in detail may be made without departing from the spirit or losing the advantages of the invention.

Having thus described the invention, what is claimed as new and desired to secure by Letters Patent is:

1. In an electric hair clipper having a housing, a motor shaft within said housing, a stationary comb blade at the forward end of said housing and a reciprocating cutter blade between said housing and said stationary comb blade, a transmission disposed between said motor shaft and said reciprocating cutter blade, comprising:

an eccentric circular cam member rigidly secured to the forward end of said motor shaft;

a cam follower member in operative relation with said cam member and adapted to be driven in reciprocatory manner by said cam member, said cam follower having a pair of transversely spaced ears engaging said cam member, a drive finger in engagement with said reciprocating cutter blade, and transversely extending plane guided faces, the planes of said guided faces generally parallel to each other and normal to the plane of reciprocation of said cutter blade;

a guide member secured to said housing and having transverse guide surfaces adapted to be engaged by the guided faces of said cam follower member; and means between said housing and said cam follower member adapted to exert a force on said cam follower member which provides cutting bias between said blades.

2. The combination of claim 1 wherein said cam member, said ears and said guided faces of said cam follower member and the guide surfaces of said guide member are formed of plastic materials with one of said guide surfaces of said guide member being a face of a flexible wall.

3. The combination of claim 2 wherein said flexible wall of said guide member is at the forward end of said guide member.

4. The combination of claim 2 wherein the plastic materials of said cam member, said cam follower member and said guide member have the characteristic of changing dimension under stress whereby said elements initially may have interference fits.

5. The combination of claim 1 wherein said ears engaging said cam member are of plastic material having inherent flexibility.

6. The combination of claim 5 with the addition of a web connecting said ears, said web serving as a retainer for a lubricant.

7. The combination of claim 1 wherein said force-exerting means comprises a pair of spaced helical compression springs disposed between said housing and said cam follower member, one on each side of said ears, said springs having wobble action during reciprocation of said cam follower member.

8. The combination of claim 7 wherein said cam follower member bears on the upper surface of said cutter blade and wherein said springs engage said cam follower member forwardly of said drive finger, whereby said springs tend to tilt said cam follower member forwardly and apply bias pressure to said cutter blade adjacent the teeth thereof.

References Cited

UNITED STATES PATENTS

| | | | |
|---|---|---|---|
| 1,729,332 | 9/1929 | Dremel | 30—223 |
| 1,811,903 | 6/1931 | Bree | 30—216 |
| 2,640,261 | 6/1953 | Wahl | 30—210 |
| 2,790,236 | 4/1957 | Andis | 30—210 |

ROBERT C. RIORDON, Primary Examiner

J. C. PETERS, Assistant Examiner

U.S. Cl. X.R.

30—222